United States Patent [19]

Eckstein

[11] Patent Number: 5,097,034
[45] Date of Patent: Mar. 17, 1992

[54] TRIARYLMETHANE COLOR FORMERS

[75] Inventor: Udo Eckstein, Cologne, Fed. Rep. of Germany

[73] Assignee: Bayer Aktiengesellschaft, Leverkusen, Fed. Rep. of Germany

[21] Appl. No.: 668,753

[22] Filed: May 14, 1991

Related U.S. Application Data

[63] Continuation of Ser. No. 310,455, Feb. 14, 1989, abandoned.

[30] Foreign Application Priority Data

Feb. 26, 1988 [DE] Fed. Rep. of Germany ....... 3806076

[51] Int. Cl.$^5$ ................. C07D 215/00; C07D 455/06; C07D 239/72; C07D 487/00
[52] U.S. Cl. .................................. 546/165; 544/283; 544/284; 544/285; 544/286; 544/287; 546/95; 546/96; 546/98; 546/99; 546/153; 546/155; 546/156; 546/157; 546/159; 546/160; 546/166; 548/217; 548/219; 548/221; 548/325; 548/327; 548/328; 548/329; 548/330; 548/333; 548/435; 548/439; 548/440; 548/444; 548/454; 548/455; 548/459; 548/461; 548/468; 548/484; 548/485; 548/510; 548/511
[58] Field of Search ............... 546/165, 153, 155, 156, 546/157, 159, 160, 166, 95, 96

[56] References Cited

FOREIGN PATENT DOCUMENTS 2750283 5/1979 Fed. Rep. of Germany .
0031564 2/1985 Japan .

*Primary Examiner*—Allen J. Robinson
*Assistant Examiner*—Peter G. O'Sullivan
*Attorney, Agent, or Firm*—Sprung Horn Kramer & Woods

[57] ABSTRACT

Color formers of the formula

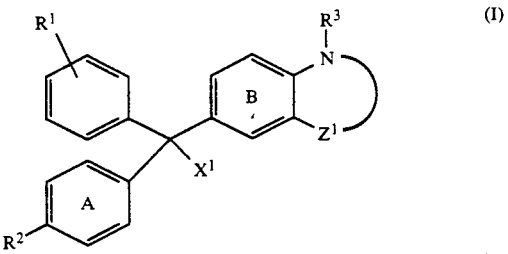

in which
  $X^1$ denotes hydroxyl, alkoxy, alkenyloxy, aralkoxy, cycloalkoxy, aryloxy or acyloxy,
  $R^1$ denotes hydrogen, halogen, alkyl or alkoxy,
  $R^2$ denotes hydrogen, alkoxy, aralkoxy, aryloxy or a radical of the formula

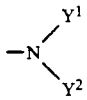

$Y^1$ and $Y^2$, independently of one another, denote alkyl, cycloalkyl or aralkyl,
  $R^2$ can form a heterocyclic ring with A in the o-position, in which a benzene ring can be additionally fused onto ring A in the o-/m-position with respect to $R^2$,
  $R^3$ denotes hydrogen, alkyl, alkenyl, aralkyl, cycloalkyl or aryl, or $R^3$ is linked to ring B in the o-position with respect to the nitrogen,
  $Z^1$ stands for the remaining members of a partially hydrogenated or completely hydrogenated ring, with the proviso that $Z^1$ does not stand for

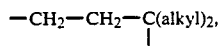

if the dialkylmethyl group is linked to the nitrogen atom, rings A and B and also the cyclic and acyclic radicals can carry further nonionic substituents, find use in thermoreactive papers and pressure-sensitive recording materials.

1 Claim, No Drawings

TRIARYLMETHANE COLOR FORMERS

This application is a continuation of application Ser. No. 310,455, filed 2/14/89, now abandoned.

The invention relates to colour formers of the general formula

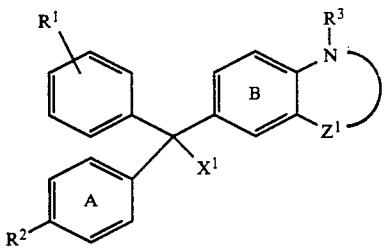

in which
 $X^1$ denotes hydroxyl, alkoxy, alkenyloxy, aralkoxy, cycloalkoxy, aryloxy or acyloxy,
 $R^1$ denotes hydrogen, halogen, alkyl or alkoxy,
 $R^2$ denotes hydrogen, alkoxy, aralkoxy, aryloxy or a radical of the formula

$Y^1$ and $Y^2$, independently of one another, denote alkyl, cycloalkyl or aralkyl,
 $R^2$ can form a heterocyclic ring with A in the o-position, in which a benzene ring can be additionally fused onto ring A in the o-/m-position with respect to $R^2$,
 $R^3$ denotes hydrogen, alkyl, alkenyl, aralkyl, cycloalkyl or aryl, or $R^3$ is linked to ring B in the o-position with respect to the nitrogen and then denotes the remaining members of a partially hydrogenated or completely hydrogenated, heterocyclic 5- or 6-membered ring which can contain a further heteroatom from the O, S, N—$R^1$ or N—$R^2$ series,
 $Z^1$ stands for the remaining members of a partially hydrogenated or completely hydrogenated, heterocyclic 5- or 6-membered ring which can contain a further heteroatom from the O, S, N—$R^1$ or N—$R^2$ series, with the proviso that $Z^1$ does not stand for

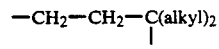

if the dialkylmethyl group is linked to the nitrogen atom, rings A and B and also the cyclic and acyclic radicals can carry further nonionic substituents customary in dye-stuff chemistry, to their preparation, to their use in thermoreactive papers and pressure-sensitive recording materials and to the preparation of highly concentrated solutions thereof in organic solvents from the group consisting of the chlorinated or unchlorinated hydrocarbons or phthalic esters and also to the use of these solutions for the preparation of pressure-sensitive recording materials.

Nonionic substituents customary in dyestuff chemistry are for example halogen, hydroxyl, alkoxy, alkenyloxy, aryloxy, aralkoxy, cycloalkyloxy, aryl, alkylmercapto, arylmercapto, aralkylmercapto, alkylsulphonyl, cyano, carbamoyl, alkoxycarbonyl, amino which can be substituted by 1 or 2 alkyl, cycloalkyl, aryl or aralkyl groups or whose substituents can be closed to a ring, preferably to a 5- or 6-membered ring, acylamino, alkylcarbonyloxy and arylcarbonyloxy and as substituents of the rings additionally alkyl, aryl, aralkyl, alkenyl or arylvinyl.

Alkyl stands for $C_1-C_{30}$-alkyl, in particular for $C_1-C_{12}$-alkyl.

The alkyl radicals and the alkyl radicals in alkoxy, alkylthio, alkylamino, alkanoylamino, alkylsulphonyl and alkoxycarbonyl groups can be branched and be substituted for example by fluorine, chlorine, hydroxyl, $C_1-C_4$-alkoxy, cyano, aryloxy or $C_1-C_4$-alkoxycarbonyl.

Aralkyl is in particular phenyl-$C_1$- to -$C_4$-alkyl which can be substituted in the phenyl ring by halogen, $C_1-C_4$-alkyl and/or $C_1-C_4$-alkoxy.

Cycloalkyl is in particular cyclopentyl or cyclohexyl which is unsubstituted or substituted by methyl.

Alkenyl is in particular $C_2-C_5$-alkenyl which can be monosubstituted by hydroxyl, $C_1-C_4$-alkoxy, cyano, $C_1-C_4$-alkoxycarbonyl, chlorine or bromine.

Vinyl and aryl are preferred.

Halogen is in particular fluorine, chlorine and bromine, preferably chlorine.

Aryl is in particular phenyl or naphthyl which is unsubstituted or substituted by one to three $C_1$- to $C_4$-alkyl, chlorine, bromine, cyano, $C_1-C_4$-alkoxycarbonyl or $C_1-C_4$-alkoxy.

Alkoxy is in particular $C_1-C_{12}$-alkoxy which is unsubstituted or substituted by chlorine or $C_1-C_4$-alkoxy.

Acyl is in particular $C_1-C_4$-alkylcarbonyl and $C_1-C_4$-alkoxycarbonyl, mono- or disubstituted aminocarbonyl or aminosulphonyl which is unsubstituted or substituted by $C_1-C_4$-alkyl, phenyl or benzyl.

Alkoxycarbonyl is in particular $C_1-C_4$-alkoxycarbonyl which is unsubstituted or substituted by hydroxyl, halogen or cyano.

The rings can be substituted by nonionic substituents, in particular by $C_1-C_4$-alkyl, $C_1-C_4$-alkoxy, cyano, nitro or halogen.

Of the colour formers of the formula (I), those compounds of the formula

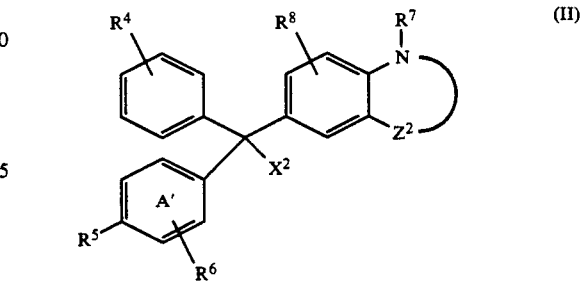

are of particular importance in which
 $X^2$ denotes hydroxyl, $C_1-C_{12}$-alkoxy or benzyloxy which is unsubstituted or substituted by $C_1-C_4$-alkoxy,
 $R^4$ denotes hydrogen, chlorine, $C_1-C_{12}$-alkys or $C_1-C_4$-alkoxy,
 $R^5$ denotes hydrogen, $C_1-C_{12}$-alkoxy, benzyloxy, phenoxy or a radical of the formula

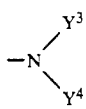

$R^6$ denotes hydrogen, chlorine, $C_1$–$C_{12}$-alkyl, $C_1$–$C_{12}$-alkoxy, $C_1$–$C_4$-alkylamino or di-$C_1$–$C_{12}$-alkylamino, $Y^3$ and $Y^4$, independently of one another, optionally denote chlorine-, cyano-, $C_1$–$C_4$-alkoxycarbonyl- or $C_1$–$C_4$-alkoxy-substituted $C_1$–$C_{12}$-alkyl, cyclohexyl or benzyl which can be substituted by chlorine, $C_1$–$C_4$-alkyl or $C_1$–$C_4$-alkoxy, or $R^5$ forms a heterocyclic ring system of the formula

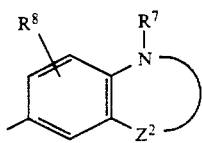  (1)

with A' in the o-position and the radical (1) stands for

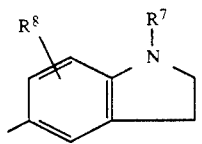 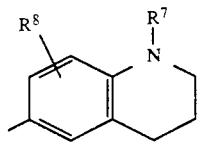

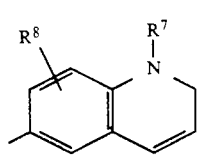 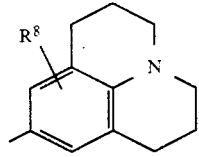

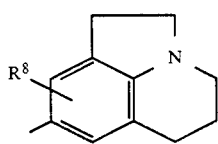 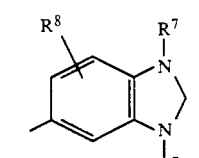

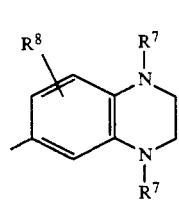 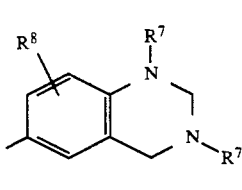

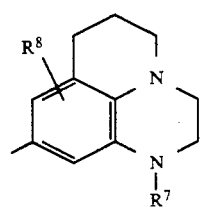 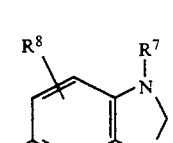

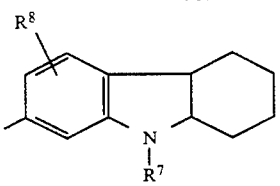

in which the (partially) saturated rings can carry up to 4 radicals from the group consisting of chlorine, $C_1$–$C_4$-alkyl, $C_1$–$C_4$-alkoxy or phenyl, with the proviso that the 2-position of the tetrahydroquinoline ring is not substituted by 2 $C_1$–$C_4$-alkyl groups, if the 3- and 4-positions are unsubstituted, and $R^7$ denotes hydrogen, $C_1$–$C_{12}$-alkyl, cyclohexyl, $C_1$–$C_4$-alkylcarbonyl which are unsubstituted or substituted by chlorine, hydroxyl, $C_1$–$C_4$-alkoxy or acetyloxy or denotes benzyl or phenyl which are unsubstituted or substituted by chlorine or $C_1$–$C_4$-alkyl and $R^8$ denotes hydrogen, chlorine, $C_1$–$C_4$-alkyl, $C_1$–$C_4$-alkoxy, amino which can be substituted by 1 or 2 $C_1$–$C_4$-alkyl, cyclohexyl, phenyl or benzyl radicals which are unsubstituted or substituted by chlorine, cyano, $C_1$–$C_4$-alkoxycarbonyl, hydroxyl or $C_1$–$C_4$-alkoxy.

Examples of radicals (1) are:

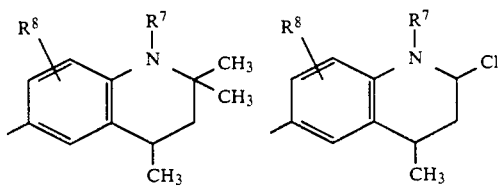

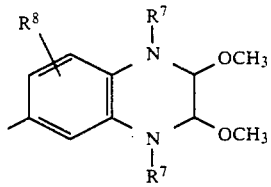

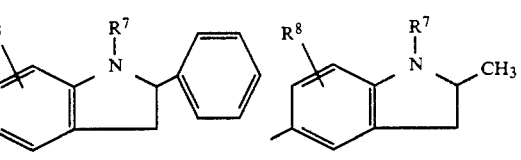

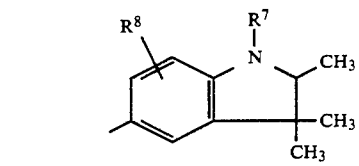

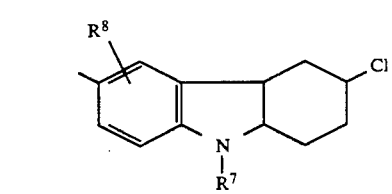

Particular preference is given to colour formers of the formula

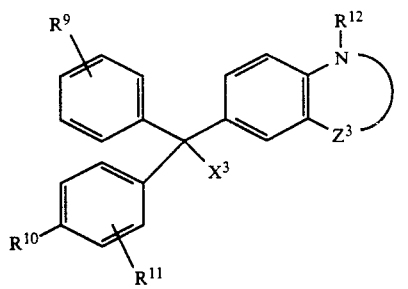

in which
X³ denotes hydroxyl or $C_1$–$C_{12}$-alkoxy,
R⁹ denotes hydrogen, chlorine, $C_1$–$C_{12}$-alkyl, methoxy or ethoxy,
R¹⁰ denotes $C_1$–$C_4$-alkoxy, benzyloxy or a radical of the formula

R¹¹ denotes hydrogen, methyl, ethyl, propyl, butyl, methoxy, ethoxy, dimethylamino or diethylamino,
Y⁵ and Y⁶, independently of one another, denote $C_1$–$C_{12}$-alkyl or benzyl which are unsubstituted or substituted by chlorine, cyano or $C_1$–$C_4$-alkoxy,
R¹² denotes hydrogen, $C_1$–$C_{12}$-alkyl or benzyl which are unsubstituted or substituted by chlorine, hydroxyl, methoxy, ethoxy or acetyloxy, or
R¹⁰ and R¹¹ are members which together with the benzyl ring to which they are bound are required to complete a ring system of the formula

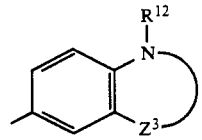

in which (2) stands for

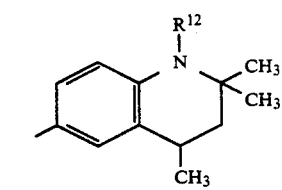 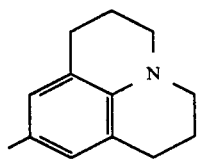

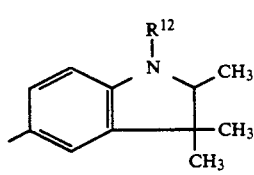 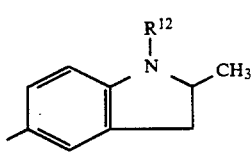 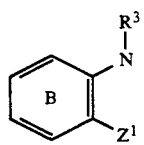

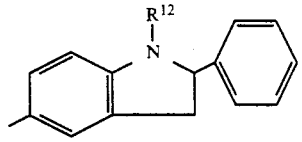

Suitable (chloro)hydrocarbons for the solutions according to the invention are high-boiling (150°–400° C.) (chloro)hydrocarbons which are liquid at room temperature, for example paraffins, in particular $C_{10}$–$C_{20}$-n-paraffins, $C_{10}$–$C_{20}$-iso-paraffins and $C_{10}$–$C_{17}$-chloroparaffins containing 15 to 70% by weight of chlorine and also the technical grade mixtures, for example kerosene ($C_{10}$–$C_{16}$-paraffin) or white oils (50 to 70% of paraffins and 30 to 50% of naphthenes), aromatic hydrocarbons containing alkyl groups having preferably 1 to 18 carbon atoms, such as alkylbiphenyl, in particular iso-propylbiphenyl, tert.-butylbiphenyl, dialkylbiphenyl, in particular di-iso-propylbiphenyl and di-tert.-butylbiphenyl, alkyl- and dialkylnaphthalene, in particular iso-propylnaphthalene and di-tert.-butylnaphthalene, alkylbenzene, in particular dodecylbenzene, hydrogenated and partially hydrogenated terphenyl, in particular cyclohexyldiphenyl, diarylalkanes, in particular diphenylethane or ethyldiphenylmethane.

Suitable esters of phthalic acid are for example those of $C_2$–$C_{18}$-aliphatic alcohols, in particular dibutyl phthalate.

Preferred highly concentrated solutions contain 10 to 50% by weight of colour formers.

The invention further relates to a process for the preparation of compounds of the formula (I), characterized in that, preferably in a one-part reaction, ketones of the formula

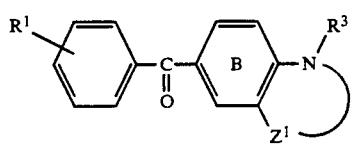

are condensed with amines of the formula

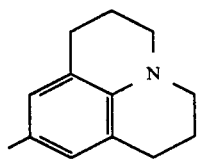

(V)

or ketones of the formula (VI)

with amines of the formula

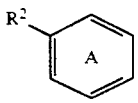

(VII)

in the presence of a condensing agent which produces an anion An⁻ to give the colour former salts of the formula

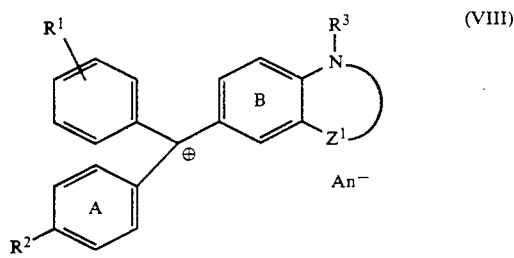

(VIII)

in which

A, B, $R^1$, $R^2$, $R^3$ and $Z^1$ have the abovementioned meaning and

An⁻ denotes an anion from the Cl, Br, acetate, sulphate or phosphate series, and this intermediate is reacted without isolation with the bases of the formula $$MeX^1 \qquad (IX),$$

in which $X^1$ has the abovementioned meaning and

Me denotes an alkali metal or alkaline earth metal ion, in particular sodium or potassium, in an organic reaction medium customary for the reaction, water-insoluble solvents are added and the resulting layers are separated off after the reaction with or without the addition of water. After removal of the low-boiling solvent from the organic phase a) the colour formers, if low-boiling, water-insoluble solvents were used, are obtained directly in very pure form or b) the ready-for-use, highly concentrated solutions, if low-boiling and high-boiling, water-insoluble solvents were used, are obtained directly.

The condensing agents used are preferably phosphorus oxychloride and/or phosphorus pentoxide.

Suitable reaction media are polar solvents such as dimethylformamide, dimethyl sulphoxide, hexamethylphosphoric triamide and alkanols. Dimethylformamide and $C_1$-$C_{18}$-alkanols are preferred.

Suitable reaction temperatures are between 20° and 120° C., preferably they are 30° to 80° C.

Suitable low-boiling (40°–145° C.), water-insoluble solvents are hydrocarbons such as dichloromethane, chloroform, carbon tetrachloride, 1,2-dichloromethane, benzene, toluene, xylene and chlorobenzene.

The triarylmethane colour formers of the formula (I) are usually colourless or at most weakly coloured.

It turned out that the colour formers of the formula (I) have a surprisingly high solubility in the water-insoluble organic solvents mentioned. Solutions containing up to 50% by weight of colour former can be obtained.

The colour former solutions obtained can be marketed without any further purification and be used in pressure-sensitive recording materials, in particular in microencapsulated materials.

They have excellent stability even in the case of variations in temperature.

For use in recording materials, they are diluted with solvents of the solutions according to the invention to concentrations of about 3 to 10% by weight.

The compounds according to the invention and also solutions thereof produce, upon contact with an acid developer, that is, an electron acceptor, intensive yellow, green-blue, green, orange or red hues which have high resistance to sublimation and high light fastness.

They are also useful in a mixture with one or more other known colour formers, for example 3,3-bis-(aminophenyl)phthalides, 3,3-bis(indolyl)phthalides, 3-aminofluoranes, 2,6-diaminofluoranes, leukoauramines, spiropyrans, spirodipyrans, chromenoindoles, phenoxazines, phenothiazines, carbazolylmethanes or other triarylmethane leuko dyestuffs, resulting in green, violet, blue, navy, grey or black dyeings.

They show good colour intensity, high light fastness and excellent ageing and CB stability not only on phenolic substrates but also on activated clays. They are suitable for pressure-sensitive recording material, which can be not only copy but also registration material. Their development rate varies, depending on the substituents. However, in general they are distinguished by a high development rate in combination with a simultaneously reduced sensitivity of the recording materials to unintentional premature development.

A pressure-sensitive material consists, for example, of at least 1 pair of sheets containing at least one colour former of the formula (I) dissolved or dispersed in a nonvolatile organic solvent and one acid developer.

Processes and formulations of this type are known, for example, from U.S. Pat. Nos. 2,800,457, 2,800,458, 2,948,753, 3,096,189 and 3,193,404 and from German Offenlegungsschriften 2,555,080 and 2,700,937.

To avoid a premature activation of the colour formers present in the pressure-sensitive recording material, they are preferably encapsulated in microcapsules which can usually be broken by the application of pressure.

Examples of suitable capsule wall materials are gelatin/gum arabic, polyamides, polyurethanes, polysulphonamides, polyesters, polycarbonates, polysulphonates, polyacrylates and phenol-, melamine- or urea-formaldehyde condensates, such as have been described, for example, in M. Gutcho, Capsule Technology and Microencapsulation, Processes and Applications, editor J. E. Vandegaar and German Offenlegungsschriften 2,237,545 and 2,119,933.

Preferably, those microcapsules are used in the process according to the invention whose shells consist of polyaddition products from polyisocyanates and polyamides and are described, for example, in German Offenlegungsschrift 3,203,059.

Thermoreactive recording systems comprise, for example, heat-sensitive recording and copying materials and copying papers.

A material of this type is described, for example, in German Offenlegungsschrift 2,555,080.

Suitable developers are the same electron acceptors, such as are used in pressure-sensitive papers, preferably phenolic compounds, which are described, for example, in German Patent 1,251,348, and also boric acid and organic, preferably aliphatic, dicarboxylic acids.

A further suitable thermoreactive developing system has been described in German Offenlegungsschrift 3,337,296 in which acid-modified polymers, preferably of acrylonitrile, act as developer.

EXAMPLE 1

23.7 g (0.13 mol) of benzophenone and 27.8 g (0.13 mol) of 1-ethyl-2,2,4-trimethyl-1,2,3,4-tetrahydroquinoline are suspended in 96.9 g (0.63 mol) of phosphorus oxychloride, and 35.9 g (0.25 mol) of phosphorus pentoxide are added. The reaction mixture is stirred at 90° C. for 20 hours and, after cooling to 10° to 15° C., poured into 400 ml of methanol with stirring at such a rate that the temperature does not exceed 40° C. 150 ml of toluene are added, and 373 g of 30% strength sodium hydroxide solution are added dropwise to the dyestuff solution over a period of 1 hour. The mixture is stirred at 40° C. for 2 hours and then poured into 500 ml of water. The organic phase is separated off, and the solvent is removed under a water pump vacuum. 150 ml of methanol are added to the residue, the mixture is heated to 60° C. for a short time and then stirred at room temperature for 48 hours. Removal of the product by filtration and drying in vacuo at 30° C. gives 41.4 g (78.2% of theory, relative to the molecular weight of 399.5) of a light grey crystalline powder of melting point 106°-108° C. and the formula

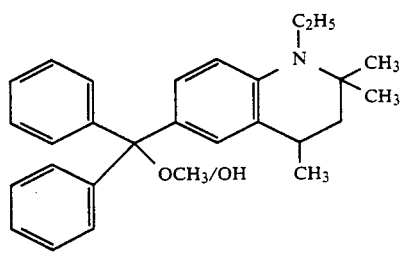

A solution in glacial acetic acid turns orange having a $\lambda_{max}$ of 468 nm, and on acidic clay a strong orange colour having very good fastness properties is developed. The $^1$H-NMR spectrum shows that the colour former consists of a mixture of about 90% of carbinol base methyl ether and about 10% of carbinol base.

EXAMPLE 2

The procedure as described in the previous example is repeated and, before the reaction with sodium hydroxide, in addition, 120 g of diisopropylnaphthalene are added. The product is worked up further as described, and, after the toluene and residual water have been removed, the remaining solution is filtered off. This gives 169 g of a dark yellow solution of the colour former described in Example 1. According to $E^1{}_1$ measurement in glacial acetic acid, the solution contains 25% of colour former. The solution can easily be diluted with further diisopropylnaphthalene, chloroparaffin ($C_{12}-C_{18}$-n-paraffin containing about 45% of chlorine), or white oil to concentrations to be used in recording materials of 3%, 5% or 7%.

EXAMPLE 3

9.1 g (0.05 mol) of benzophenone, 12.7 g (0.05 mol) of 1-hydroxyethyl-2,2,4-trimethyl-1,2,3,4-tetrahydroquinoline (86.7% strength) and 14.2 g (0.1 mol) of phosphorus pentoxide are stirred in 38.3 g (0.25 mol) of phosphorus oxychloride at 90° C. for 20 hours. The melt cooled to 15° to 20° C. is then poured into 150 ml of methanol with stirring at such a rate that the temperature does not exceed 40° C. After the addition of 50 ml of toluene, 143 g (1.07 mol) of 30% strength sodium hydroxide solution are slowly added dropwise, and the mixture is stirred at 40° C. for another 2 hours. 120 ml of water are added to the mixture, the organic phase is separated off, the solvent is removed by distillation and 70 ml of methanol are added to the residue. The mixture is heated to 60° C. for a short time and then stirred at room temperature for 2 days. After crstallization, the product is filtered off, washed with a small amount of methanol and dried at 30° C. in vacuo. Yield: 16.9 g (77.9% of theory, relative to the molecular weight of 433.9) of a light grey crystalline powder of the melting range 80°-85° C. and the formula:

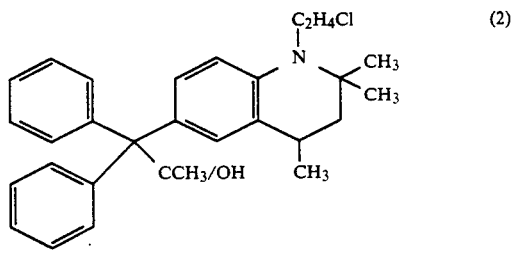

A solution in acetic acid turns orange having a $\lambda_{max}$ of 480 nm. On acidic clay, likewise, a strong orange colour having high CF and CB stabilities is obtained.

EXAMPLE 4

12.8 g (0.05 mol) of 2-methyl-4,4'-dimethoxybenzophenone and 11.4 g (0.05 mol) of 1-ethyl-2,2,4-trimethyl-1,2,3,4-tetrahydroquinoline (90.4% strength) are thoroughly stirred at room temperature in 41 g (0.27 mol) of phosphorus oxychloride. After the addition of 14.2 g (0.1 mol) of phosphorus pentoxide, the mixture is stirred at 40° C. for 12 hours. The dyestuff melt is then poured onto 600 ml of ice-water, the solution is clarified with 10 g of activated carbon, filtered off and 50 g of sodium chloride are added to the filtrate. The dye-stuff resin which precipitates is isolated and dried. Yield: 16.9 g (70.7% of theory) of a dark red powder of melting point 78°-79° C.

27 g (0.15 mol) of 30% strength sodium methylate solution are slowly added dropwise at 40° C. to the solution of 23.8 g (0.05 mol) of this dyestuff in 80 ml of dimethylformamide. The mixture is stirred at this temperature for 1 hour, filtered off and poured onto 1,000 ml of ice-water. After the addition of 50 g of sodium chloride, the almost colourless precipitate is filtered off, washed with cold water and dried at 30° C. in vacuo. This gives 18 g (76% of theory) of an almost colourless crystalline powder of melting point 60°-63° C. and the formula:

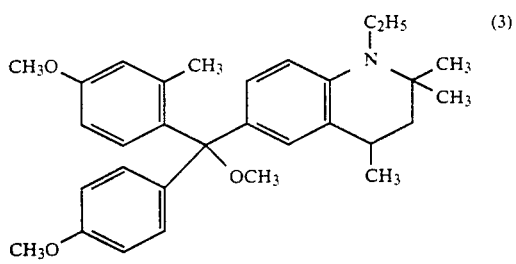

A solution in glacial acetic acid turns strongly red having a $\lambda_{max}$ of 526 nm and $\lambda_2$ of 420 nm. On acetic clay, a strong carmine red colour is developed.

EXAMPLE 5

35.4 g (0.13 mol) of 2,4,4'-trimethoxybenzophenone are added in portions over a period of about 20 minutes to 96.6 g (0.63 mol) of phosphorus oxychloride and 28.8 g (0.2 mol) of phosphorus pentoxide, during the course of which the temperature rises to about 30° to 35° C. 26.2 g (0.13 mol) of 1-ethyl-2,2-4-trimethyl-1,2,3,4-tetrahydroquinoline are finally added dropwise to the mixture without a substantial increase in the temperature. The mixture is further warmed to 40° C. and stirred at this temperature for 5 hours. The melt cooled to room temperature is then introduced into 300 ml of methanol at such a rate that a temperature of 50° C. is not exceeded. 200 ml of toluene are added to the methanolic dyestuff solution. 500 g of 30% strength sodium methylate solution are then added dropwise at such a rate that the temperature is adjusted to about 40° C. The mixture is then stirred at 40° C. for another hour. 800 ml of water are then added dropwise, and the mixture is stirred for 30 minutes. The aqueous/methanolic phase which separates out at the bottom is separated off. From the organic phase, the solvent and residual water are removed in vacuo. 100 ml of methanol are added to the residue, the mixture is heated to 50° to 60° C. for a short time and allowed to cool slowly to room temperature. The product is filtered off with suction, washed with a small amount of methanol and dried in vacuo at 30° C. to give 41.2 g (64.8% of theory) of beige crystals of melting point 70°-75° C. and the formula:

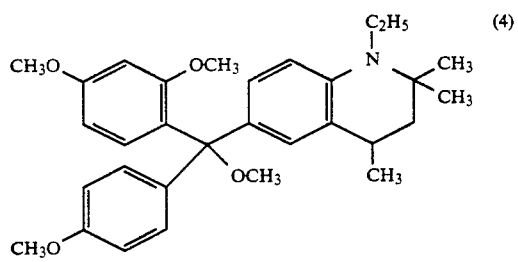

A solution in glacial acetic acid turns dark violet having a $\lambda_{max}$ of 556 nm and $\lambda_2$ of 444 nm. On acidic clay, a strong red-violet print having good fastness properties is obtained.

EXAMPLE 6

44.4 g (0.13 mol) of 2,4'-diethoxy-4-diethylaminobenzophenone and 22.8 g (0.13 mol) of 1,2,3,3-tetramethylindoline are initially introduced in 50 ml of anhydrous toluene. 24.7 g (0.18 mol) of phosphorus pentoxide are added in portions in room temperature and finally 96.6 g (0.63 mol) of phosphorus oxychloride are added dropwise at such a rate that the temperature does not exceed 50° C. The reaction mixture is stirred at this temperature for another 3 hours. The melt cooled to 20° C. is then slowly introduced into 1,000 ml of ice-water. 150 ml of toluene are added to the mixture and 370 g (2.78 mol) of 30% strength sodium hydroxide solution are added dropwise. The temperature settles at about 40° C. and is maintained at this temperature for 3 hours with stirring. The mixture is allowed to separate and the aqueous phase separating out at the bottom is separated off. From the organic phase, toluene and residual water are removed azeotropically under a water pump vacuum. A small amount of methanol is added to the residue, and the product is allowed to crystallize below 20° C. It is filtered off, washed and dried in vacuo at 30° C. to give 57.5 g (85.6% of theory) of a light grey crystalline powder of melting range 50°-56° C. and the formula:

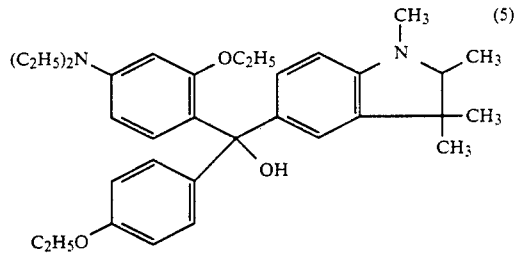

A solution in glacial acetic acid turns green having a $\lambda_{max}$ of 622 nm and $\lambda_2$ of 473 nm.

The colour former dissolves in diisopropylnaphthalene to give a 20% strength solution and in chloroparaffin ($C_{12}$-$C_{18}$-n-paraffin containing about 45% of chlorine) to give a 30% strength solution. On acidic clay or bisphenol A, strong dark-green shades are obtained.

Analogously to Examples 1, 3, 5 and 6, the following colour formers are prepared:

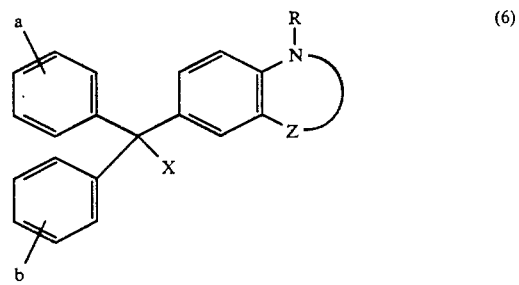

| Example | a | b | (structure) | X | shade on acidic clay or bisphenol A |
|---|---|---|---|---|---|
| 7 | 4-OCH$_3$ | 4-OCH$_3$ | 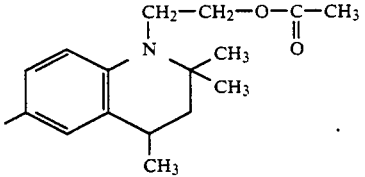 | OH | dark-red |
| 8 | 4-OC$_2$H$_5$<br>2-CH$_3$ | 4-OC$_2$H$_5$ | 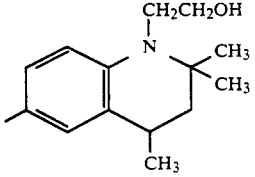 | OH | red |
| 9 | 4-OCH$_3$<br>3-OCH$_3$ | 4-OCH$_3$ | 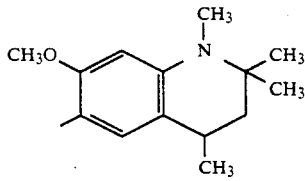 | OCH$_3$ | red-violet |
| 10 | 4-OC$_4$H$_9$<br>2-Cl | 4-OC$_4$H$_9$ | 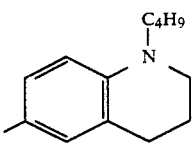 | OCH$_3$/OH | raspberry-red |
| 11 | 4-OCH$_3$<br>3-Cl | 4-C$_3$H$_7$-n | 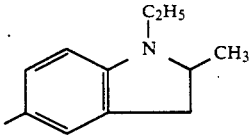 | OC$_4$H$_9$ | orange-red |
| 12 | 2-OCH$_3$ | H | 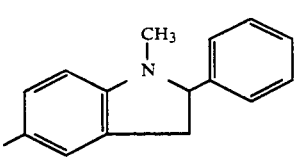 | OC$_2$H$_5$ | orange |
| 13 | 4-OC$_2$H$_5$ | 4-Cl<br>2-Cl | 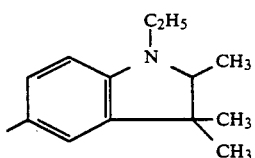 | OC$_3$H$_7$-i/OH | red |
| 14 | 4-Cl<br>2-Cl | 4-Cl | 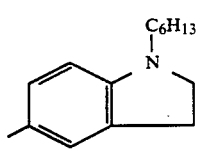 | OCH$_3$ | yellow |

-continued

| Example | a | b | (structure with R, Z) | X | shade on acidic clay or bisphenol A |
|---|---|---|---|---|---|
| 15 | 2-Cl | 4H | 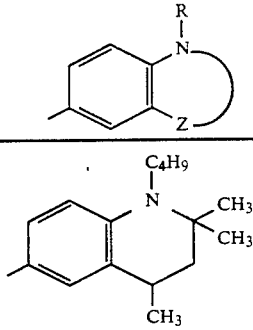 | OH | yellow-orange |
| 16 | 2-Cl | 4-N(C$_2$H$_5$)$_2$ | 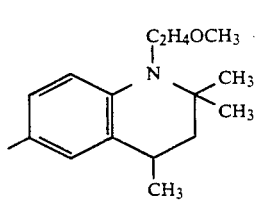 | C$_2$H$_4$OCH$_3$ | turquoise |
| 17 | 4-OC$_2$H$_5$ | " | 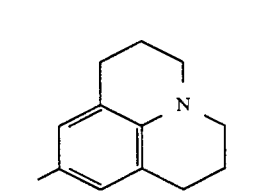 | OC$_2$H$_5$ | green |
| 18 | 4-OCH$_3$ | 4-N(C$_2$H$_5$)(C$_2$H$_4$Cl), 2-CH$_3$ | 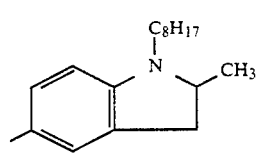 | OH | dark-green |
| 19 | 4-N(CH$_3$)$_2$, 2-N(CH$_3$)$_2$ | 4-OCH$_3$ | 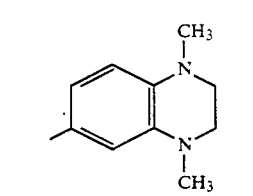 | OCH$_3$/OH | black-green |
| 20 | 4-N(C$_2$H$_5$)(CH$_2$—C$_6$H$_5$) | 4-OC$_4$H$_9$, 3-Cl | 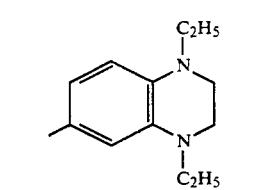 | OC$_3$H$_7$-i | olive-green |
| 21 | 4-OCH$_3$ | N-C$_6$H$_{13}$ piperidine | 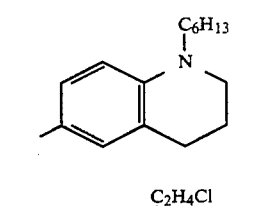 | OCH$_3$/OH | dark-green |
| 22 | H | N-C$_2$H$_4$Cl, 2,2,4-trimethyl piperidine | 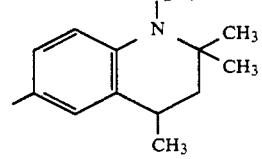 | OCH$_3$/OH | dark-green |

-continued

| Example | a | b | R, Z (substituent) | X | shade on acidic clay or bisphenol A |
|---|---|---|---|---|---|
| 23 | 4-OCH₃ | 4-N(C₄H₉-n)₂<br>2-C₄H₉-n | 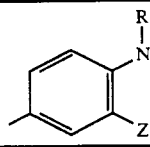 | OC₄H₉ | green |
| 24 | " | 4-N(CH₃)₂ | 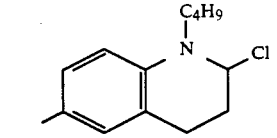 | OC₄H₉ | green |

EXAMPLE 25

5 g of the colour former according to Example 1 are dissolved in a mixture of 60 g of dodecylbenzene and 40 g of chloroparaffin containing 45% of chlorine. 223 g of this solution are mixed with 39.5 g of oxadiazinetrione obtained from Desmodur H (NCO content 20.5%). This mixture is then mixed with 320 g of 0.5% strength polyvinyl alcohol solution and emulsified in the shear gradient of a rotor/stator emulsifying apparatus. The cross-linking is carried out using 76 g of 9.0% strength diethlenetriamine solution. The aftertreatment takes place by heating the dispersion to 60° C. and stirring it at 60° C. for three hours. This gives a dispersion containing 40% of capsules of the capsule size 7.3 μm.

250 ml of this dispersion are initially introduced, and 40 g of fine cellulose powder (Arbocell BE 600/30 from Rettenmeier und Sohne) are slowly added with vigorous stirring. After a period of at least 30 minutes of intensive stirring, 40 ml of 50% strength SBR latex (Baystal P 1600 from Bayer AG) are added. The resulting 48.5% strength coating composition is diluted with water to a solids content of 30% and is coated onto the back of a commercially available base paper by means of an air brush. After drying, the add-on weight is 5 g/m².

The paper thus coated is placed with its coated side on the developer-coated side of a commercially available no-carbon copying paper. Applying a pressure by writing on the paper coated with capsules gives an orange copy on the copying paper which is stable when exposed to light.

EXAMPLE 26

Example 25 is repeated, using 5 g of the colour former of Example 4, to give a paper coated with microcapsules which affords a red copy in an analogous manner.

EXAMPLE 27

171 parts of an approximately 13% strength solution of a polyacrylic acid having an average molecular weight below 300,000 are brought to a pH of 4.5 with triethanolamine and to a total amount of 1,000 parts with water.

160 parts of a 90% melamine/formaldehyde resin (Luwipal 68 from BASF, Ludwigshafen) are added to this solution.

1,300 parts of a solution of 5% colour former of Example 2 in diisopropylnaphthalene (KMC 113 from Rutgers Kureha Solvent, Duisburg) are added, and an emulsion is prepared by means of a high-speed mixing siren.

The emulsion is then diluted with 700 parts of water, heated to 60° C. with stirring and allowed to complete the reaction at 60° C. for 6 hours. After cooling, the dispersion is neutralized with triethanolamine.

This gives a 40% strength microcapsule dispersion of the average capsule size of 5 μm.

EXAMPLE 28

In a ball mill, 32 g of 4,4'-isopropylidenediphenol, 3.8 g of distearylamide of ethylenediamine, 89 g of kaolin, 20 g of a polyvinyl alcohol having a hydrolysis degree of 88% and 55 ml of water are milled until the particle size is about 5 μm. In a second ball mill, 6 g of the compound of Example 6, 3 g of a polyvinyl alcohol having a hydrolysis degree of 88% and 60 ml of water are milled to a particle size of about 3 μm. The two dispersions are combined and coated onto paper at a dry coating rate of 5.5 g/m². Touching the paper with a heated ball-point pen gives an intensive green colour which has good light and sublimation fastness.

EXAMPLE 29

According to German Offenlegungsschrift 3,337,296, 40 g of a fine-powdered polyacrylonitrile polymer prepared from 94% of acrylonitrile, 0.5% of methallylsulphonic acid and 5.5% of methyl acrylate are milled with 225 g of an 8% strength aqueous polyvinyl alcohol solution and with the addition of 1.3 g of distearyl phosphate in a ball mill. A second dispersion is prepared from 1 g of the compound of Example 1 and 55 g of an 8% strength aqueous polyvinyl alcohol solution. The dispersion of the colour former is mixed with that of the acceptor in the ratio of 1:10, and the mixture is applied to cellulose paper by means of a blade, and the coating is dried to give an add-on weight of 6 to 7 g/m². The paper can be written on with writing materials such as, for example, a ball-point pen. It is insensitive to the application of strong pressure. Touching the paper with a heated pen gives a bright, crisp, shadow-free, orange script. The light fastness of the colouring is excellent.

I claim:
1. Color former of the general formula

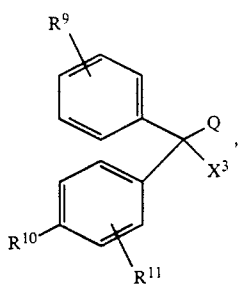

in which

X³ denotes hydroxyl or $C_1$-$C_{12}$-alkoxy,

R⁹ denotes hydrogen, chlorine, $C_1$-$C_{12}$-alkyl, methoxy or ethoxy,

R¹⁰ denotes $C_1$-$C_4$-alkoxy, benzyloxy or a radical of the formula

R¹¹ denotes hydrogen, methyl, ethyl, propyl, butyl, methoxy, ethoxy, dimethylamino or diethylamino, Y⁵ and Y⁶, independently of one another, denote $C_1$-$C_{12}$-alkyl or benzyl which are unsubstituted or substituted by chlorine, cyano or $C_1$-$C_4$-alkoxy, R¹⁰ and R¹¹ are members which together with the benzyl ring to which they are bound are required to complete a ring system Q, in which Q is

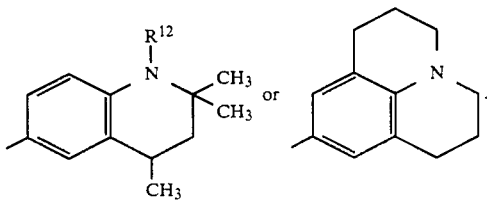

* * * * *

UNITED STATES PATENT AND TRADEMARK OFFICE
CERTIFICATE OF CORRECTION

PATENT NO. : 5,097,034

DATED : March 17, 1992

INVENTOR(S) : Udo Eckstein

It is certified that error appears in the above-identified patent and that said Letters Patent is hereby corrected as shown below:

Title page, item (22) Filed:  Delete " May " and substitute -- March --

Signed and Sealed this

Sixth Day of July, 1993

Attest:

MICHAEL K. KIRK

*Attesting Officer*     Acting Commissioner of Patents and Trademarks

UNITED STATES PATENT AND TRADEMARK OFFICE
CERTIFICATE OF CORRECTION

PATENT NO. : 5,097,034

DATED : March 17, 1992

INVENTOR(S) : Udo Eckstein

It is certified that error appears in the above-identified patent and that said Letters Patent is hereby corrected as shown below:

Title Page    [22] Filed : Delete " May 14, 1991 " and substitute
-- March 14, 1991 --

Signed and Sealed this

Twenty-second Day of March, 1994

Attest:

BRUCE LEHMAN

Attesting Officer     Commissioner of Patents and Trademarks